(12) United States Patent
Khotimsky (10) Patent No.: US 6,574,665 B1
(45) Date of Patent: Jun. 3, 2003

(54) HIERARCHICAL VECTOR CLOCK

(75) Inventor: Denis Andreyevich Khotimsky, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/387,115

(22) Filed: Aug. 31, 1999

Related U.S. Application Data (60) Provisional application No. 60/121,750, filed on Feb. 26, 1999.

(51) Int. Cl.[7] ............................................. G06F 15/173
(52) U.S. Cl. ......................................... 709/224; 703/17
(58) Field of Search ................................ 709/200–203, 709/224–227, 247, 237; 370/400; 703/16, 17; 707/201; 711/121; 712/200, 222; 375/354, 240; 713/17; 702/76; 607/32; 714/47

(56) References Cited

U.S. PATENT DOCUMENTS

| | | | | |
|---|---|---|---|---|
| 5,138,615 A | * | 8/1992 | Lamport et al. | 370/400 |
| 5,524,212 A | * | 6/1996 | Somani et al. | 711/121 |
| 5,581,753 A | * | 12/1996 | Terry et al. | 707/201 |
| 5,627,984 A | * | 5/1997 | Gupta et al. | 712/200 |
| 5,745,700 A | * | 4/1998 | Caci | 709/247 |
| 5,768,500 A | * | 6/1998 | Agrawal et al. | 714/47 |
| 5,805,874 A | * | 9/1998 | Gallup et al. | 712/222 |
| 5,905,766 A | * | 5/1999 | Nguyen | 375/354 |
| 6,031,987 A | * | 2/2000 | Damani et al. | 703/17 |
| 6,341,262 B1 | * | 1/2002 | Damani et al. | 703/16 |

OTHER PUBLICATIONS

Plakal et al, Lamport Clocks: Verifying a Directory Cache-Coherence PRotocol, IEEE 6–7, 1998.*
Meng, Optimistic Mechanism, www.cs.panam.edu/~meng/Course/CS6337/Note/master/node22.html.*
Lamport Clocks: Verifying a Directory Cache–Coherent Protocol. 1998.*
"ATM–Forum Private Network–Network Interface Specification Version 1.0", *ATM Forum*, Mar. 1966.
L. Lamport, "Time, Clocks, and the Ordering of Events in a Distributed System", *Communications of the ACM*, vol. 21, No. 7, Jul. 1978, pp 558–564.
D. Haban et al, "Global Events and Global Breakpoints in Distributed Systems", *Proceedings of the Twenty–First Annual Hawaii International Conference on System Sciences*, Jan. 1988, pp 166–175.
F. Mattern, "Virtual Time and Global States of Distributed Systems", *Parallel And Distributed Aglorithms*, M. Cosnard et al. (editors), Elsevier Science Publishers B. V. (North Holland), 1988, pp 215–226.

(List continued on next page.)

*Primary Examiner*—Mark Powell
*Assistant Examiner*—Thong Vu (57) ABSTRACT

A hierarchial vector clock (HVC) providing a logical time system to a collection of distributed systems. HVC is not restricted to any fixed number of hierarchy levels and scals naturally when the number of levels increases. Unlike constant-size clocks, its storage and processing requirements grow gracefully at approximately a logarithmic rate with the number of distributed sites within the distributed system. HVC is well suited for modern, message-passing distributed systems which make use of highly hierarchical communication networks.

14 Claims, 2 Drawing Sheets

OTHER PUBLICATIONS

C. J. Fidge, "Timestamps in Message–Passing Systems That Preserve the Partial Ordering", *Proc. 11th Australian Comp. Sci. Conference*, 1988, pp. 56–66.

M. Raynal, "About Logical Clocks For Distributed Systems", *ACM Operating Systems Review*, vol. 26, No. 1, Association for Computing Machinery, 1992, pp 41–48.

F. J. Torres–Rojas et al., "Plausible Clocks: Constant Size Logical Clocks For Distributed Systems", *Distributed Algorithms, 10th International Workshop*, vol. 1151 of Lecture Notes In Computer Science, Babaoglu and Marzullo, editors, Bologna, Italy, Oct. 9–11, 1996, Springer Verlag, pp 71–88.

B. Charron–Bost, "Concerning The Size of Logical Clocks In Distributed Systems", *Information Processing Letters*, vol. 39, 1991, pp 11–16.

M. Singhal et al, "An Efficient Implementation of Vector Clocks", *Information Processing Letters*, vol. 43, No. 1, pp 47–51.

J. Fowler et al, "Causal Distributed Breakpoints", *Proc. 10th Intl. Conference Distributed Computing Systems (ICDCS–10)*, Paris, France, May 28–Jun. 1, 1990, pp 124–141.

C. Jard et al, "Incremental Transitive Dependency Tracking In Distributed Computations", *Parallel Processing Letters*, vol. 6, No. 3, (1996), pp 427–435.

S. K. Sarin et al, "Discarding Obsolete Information in a Replicated Database System", *IEEE Transactions on Software Engineering*, vol. SE–13, No. 1, Jan. 1987, pps 39–47.

C. Fidge, "Logical Time in Distributed Computing Systems", *Computer*, Aug. 1991, pps 28–29.

K. Audenaert, "Clock Trees: Logical Clocks for Programs with Nested Parallelism", *IEEE Transactions on Software Engineering*, vol. 23, No. 10, Oct. 1997, pps 646–658.

M. Ahuja et al, "Passive–space and Time View: Vector Clocks for Achieving Higher Performance, Program Correction and Distributed Computing", *IEEE Transactions on Software Engineering*, vol. 19, No. 9, Sep. 1993, pps 845–855.

R. Prakah et al, "Dependency Sequences and Hierarchical Clocks: Efficient Alternatives to Vector Clocks For Mobile Computing Systems", *Wireless Networks*, No. 3 (1997) pps 349–360.

A. Gahlot et al, "Hierarchical Clocks", *Technical Report OSU–CISRC–93–TR19*, Dept. of Comput. and Inf. Sci., Ohio State Univ., Columbus, OH, USA, May 1993.

Wuu et al, "Efficient Solutions to the Replicated Log and Dictionary Problems", *Proceedings of the Third Annual ACM Symposium on Principles of Distributed Computing*, Vancouver, B.C., Canada, Aug. 27–29, 1984, pps 233–242.

* cited by examiner

HIERARCHICAL VECTOR CLOCK

CROSS REFERENCE TO RELATED APPLICATION

This application claims the benefit of United States Provisional Application No. 60/121,750 filed Feb. 26, 1999 and incorporated herein by reference.

FIELD OF THE INVENTION

The present invention relates generally to the field of distributed systems and in particular, to the application of logical time for detecting causality in a system containing a large number of distributed sites that don't share global memory and exchange information by passing messages over a communications network.

BACKGROUND OF THE INVENTION

Modern data networks possess a multilevel hierarchical structure (See, e.g.,"ATM-Forum Private Network-Network Interface Specification Version 1.0", ATM Forum, March 1996), where certain sets of physical or logical nodes are grouped together according to physical, geographical, and/or administrative considerations. A distributed application running on such a network may involve thousands of sites belonging to different logical nodes with transport channels between them extending through multiple domain boundaries and crossing multiple hierarchical levels. Knowledge of causality between the events in such a system is essential for analyzing the system behavior and ensuring the correct operation through solving various problems related to mutual exclusion, consistency maintenance, fault tolerance and recovery. Unfortunately however, synchronous methods of causality tracking may be unavailable due to the absence of global clock and unpredictable communication delays, whereas straightforward logging of the local and remote events and exchanging logs along with messages is impractical due to a system's size and lifespan. In these circumstances, using logical time is a technique which allows efficient encoding of information contained in an event log and causality tracking while keeping the communication overhead low.

BASIC NOTIONS AND PROPERTIES

The notion of logical time, based on the concept of one event happening before another in a distributed system, was described by L. Lamport in an early paper entitled "Time, clocks, and the orderings of events in a distributed system", which appeared in Communications of ACM, Vol. 21, pp. 558–564, 1978 and which subsequently attracted great amount of attention. (See, for example, Haban and Weigel, "Global events and global breakpoints in distributed systems", Proceedings of the Twenty-First Annual Hawaii International Conference on System Sciences, pp. 166–175, January 1988; F. Mattern, "Virtual time and global states of distributed systems", M. Cosnard et. al., editors, Proceedings of the International Workshop on Parallel and Distributed Algorithms, pp. 215–226, Amsterdam, 1989. Elsevier Science Publishers; C. J. Fidge, "Timestamps in message-passing systems that preserve the partial ordering", Proc. 11th Australian Comp. Sci. Conf., pp. 56–66, 1988; M. Raynal, "About logical clocks for distributed systems", "ACM Operating Systems Review", vol. 26. Association for Computing Machinery, 1992; J. Torres-Rojas and Mustaque Ahamad, "Plausible clocks: Constant size logical clocks for distributed systems", Babaoglu and Marzullo, editors, "Distributed Algorithms, 10th International Workshop", vol. 1151 of "Lecture Notes in Computer Science", pp. 71–88, Bologna, Italy, 9–11~October 1996. Springer Verlag.

In a distributed system, where no global shared memory is available and messages are exchanged over a communication network, event e is said to causally precede event f($e \rightarrow f$), if e can potentially affect f, in other words, by the epoch event f occurs, the process hosting event f has already received the information on the occurrence of event e.

Two distinct events e and f in H for which neither $e \rightarrow f$ of nor $f \rightarrow e$ holds are called concurrent ($e \| f$). Relation $\rightarrow$ is an order relation on the event set H of the distributed system, but it does not introduce a total order. Relation $\|$ is not transitive.

Logical time provides a means to encode the causality information contained in the partial order (H, $\rightarrow$) by assigning timestamps to all events, so that comparing two event timestamps allows one to draw a conclusion about the causal ordering of these events. Formally, a logical time system contains:

- the logical time domain T with a comparison function f: $T \times T \rightarrow R$, where R is a set of four outcomes, "less than" (<), "greater than" (>), equal to" (=), and "incomparable" ($\Diamond$);
- the message tag domain, S;
- the set of rules which allow, for each send message event f, to form a message tag $s(f) \in S$ to be transmitted along with the message;
- a set of rules which allow the assignment of a timestamp $C \in T$ to each event in the system's event set H, such that for any two events e, $f \in H$, the following condition holds:

$$e \rightarrow f \Rightarrow C(e) < C(f) \quad [1]$$

This monotonicity condition [1] is referred to as clock condition or weak clock consistency. A logical time system is strongly consistent if the converse of equation [1] holds, namely:

$$e \rightarrow f \Leftrightarrow C(e) < C(f) \quad [2]$$

and is isomorphic (or, equivalently, is said to characterize causality), if $\forall e, f \in$ in H:

$$e \rightarrow f \Leftrightarrow C(e) < C(f);$$

$$e = f \Leftrightarrow C(e) = C(f);$$

$$e \| f \Leftrightarrow C(e) \Diamond C(f).$$

DESCRIPTION OF THE PRIOR ART

Totally Ordered Process Event Sets

Causal precedence or "happened-before" relation for a system with totally ordered process event sets was defined by Lamport for a system with totally ordered as the smallest relation on the set H of events in the system, such that:

i. if events e and f belong to the same process and e precedes f in the event sequence of that process, then $e \rightarrow f$;

ii. if e denotes a message send event and f is a reception event of the same message by another process, then $e \rightarrow f$, iii. if $e \rightarrow f$ and $f \rightarrow g$, then $e \rightarrow g$.

Scalar Lamport Clock

Lamport defined a logical time system, commonly known as Lamport clock, which used the set of non-negative integers as the logical time domain, T=N. Each process maintains its logical time, which is initialized to zero and is incremented by 1 (or any positive value) when an internal event or message sent event occurs. The event is stamped with the value of the incremented logical time.

More specifically, the timestamp of a send message event is transmitted with the message (G=T). The timestamp of each message receive event is obtained by incrementing the maximum of the process' logical time value and the sender's timestamp extracted from the message. Thus the value of the process' logical time is always larger than the maximum message tag received so far, therefore, it could be shown that Lamport clock is weakly consistent. However, since non-negative integers form a totally ordered set, the Lamport clock does not allow one to capture concurrency.

Vector Clock

To overcome this problem, a concept of vector clock was later proposed by a number researches, most notably C. Fidge in an article entitled "Timestamps in message-passing systems that preserve partial ordering", that appeared in *Proc. 11$^{th}$ Australian Comp. Sci. Conf.*, pp 55–66 in 1988; and an article by F. Mattern entitled "Virtual time and global states of distributed systems", in Proceedings of the International Workshop on Parallel and Distributed Algorithms, M. Cosnard et. al. editors, pp. 215–226, Amsterdam, 1989, Elsevier Science Publishers. Logical time domain is an integer vector space $T=N^n$, where n is the number of processes in the system. Each process $P_i$ maintains a vector $V^i=(v_1^i v_2^i \ldots v_n^i)$, which contains one component per each parallel task.

Two vectors $V^i$ and $V^j$ are equal, if all their components are equal; $V^i < V^j$, if and only if $v_k^i \leq v_k^j$, for all k=1, . . . ,n, and there exist at least one k, such that $v_k^i \leq v_k^j$. In all other cases, $V^i$ and $V^j$ are incomparable. For each event occurring at process $P_i$, the i-th component of the logical time vector $V^i$ is incremented. For each send message event, the entire vector with the incremented local component is transmitted along with the message. When a message is received by $P_i$, the non-local components of $V^i$ are updated by taking the component-wise maximum of $V^i$ and the sender's vector clock extracted from the message. Without loss of generality, the local component of a vector timestamp can be viewed as the sequential number of the event in the local event order. Then each non-local component corresponds to an index of the most recent event at process $P_j$ which is known to process $P_i$.

The vector clock possesses a number of attractive properties. First, a logical time system based on a vector clock of size n is isomorphic. Besides, to determine causal relation between two distinct events e and f occurring, respectively, at process $P_i$ and process $P_j$, which are not necessarily distinct, it is sufficient to compare only one component of their vector timestamps:

$$e \to f \Leftrightarrow V^i[i] \leq V^j[i] \qquad [3]$$

However, B. Charron-Bost showed, in an article entitled "Concerning the size of logical clocks in distributed systems", which appeared in Information Processing Letters, 39:11–16, 1991, that in order to maintain clock isomorphism, the size of the vector timestamp has to be at least equal to the number of processes in the system. Therefore, the storage and communication overhead, as well as the processing time, grow linearly with the system size n, making the cost of the vector clock in a large distributed system prohibitively high.

Isomorphic Variations of Vector Clock

A number of vector clock optimizations applicable in certain special cases have been proposed. The differential technique of M. Singhal and A. Kshemkalyani (See, e.g., M. Singhal and A. Kshemkalyani, "An efficient implementation of vector clocks", Information Processing Letters 43(1): 47–52, August 1992), reduces the communication overhead by transmitting only those vector components that have changed since the most recent transfer. The dependency method described by J. Fowler and W. Zwaenopoel, in an article entitled "Causal distributed breakpoints", that appeared in Proc. 10th Intl. Conf. Distributed Computing Systems (ICDCS-10), Paris, France, May 28–Jun. 1, 1990. EEE, allows a process to store only the information related to the direct dependencies between processes and reduces the size of a message tag to a scalar value, at the expense of the substantial latency and overhead required to recursively recompute the causal precedence information off-line. Other proposed optimization can be found in an article entitled "Incremental transitive dependency tracking in distributed computations", authored by C. Jard and G. V. Jourdan, that appeared in Parallel Processing Letters}, 6(3):427–435, September 1996. All these techniques described are restricted to the certain special cases and don't affect the impossibility result described in the art.

Matrix Clock

Another related approach which has been used to discard obsolete information in replicated databases is the matrix clock, as described by Wuu and Bernstein in an article entitled "Efficient solutions to the replicated log and dictionary problems", that appeared in Proceedings of the Third Annual ACM Symposium on Principles of Distributed Computing, pages 233–242, Vancouver, B. C., Canada, Aug. 27–29, 1984, and an article by Sarin and Lynch entitled "Discarding obsolete information in a replicated database system", tse, SE-13(1):39–47, January 1987.

Both the event timestamps and the message tags are defined on the set of integer matrices $N^n \times N^n$, where k-th component of the j-th row of the logical time matrix maintained by process $P_i$ corresponds to the $P_i$'s view of the most recent event belonging to the process $P_k$ which is known to process $P_j$. The (i,i)-th component of the $P_i$'s logical time matrix is incremented for each local event occurring at $P_i$, the other components are updated by taking the component-wise maximum of the local matrix and the message tag. The memory and communication overhead of the matrix clock prevents its usage to determine causality in large distributed systems.

Non-Isomorphic Approximations of Vector Clock

A class of logical time systems, referred to as Plausible clocks, sacrifice isomorphism to maintain simplicity of the timestamps and messages, are defined by the following properties:

$$e \equiv f \Leftrightarrow C(e) = C(f);$$
$$e \to f \Leftrightarrow C(e) < C(f); \qquad [4]$$
$$e \leftarrow f \Leftrightarrow C(e) > C(f).$$

They can be viewed as an approximation of the isomorphic vector clock which are able to detect concurrency between events in H with certain degree of accuracy. The plausible logical time systems form a partial hierarchy, any two of which can be combined to produce another plausible logical time system of higher accuracy than the original ones. A simple example of plausible clock is provided by Lamport clock with the added process identity to disambiguate between different events having the same scalar timestamp is plausible. Another examples of the constant size plausible clocks include the R-entry vector clock and the K-Lamport clock.

R-entry vector clock is a variant of the vector clock with added process identity where the event timestamps and the message tags belong to a vector space $N^r$, and the vector size r is fixed and independent of n, the number of processes in the system. Each component of the vector timestamp corresponds to the maximum sequential index of an event occurring at some subset of processes in the system, such that this event causally precedes the given local event. The simple mapping of a process identity into the vector component index is given by a modulo-r function. The vector timestamp comparison function can be modified accordingly, so that $\forall e, f \in H$:

$C(e) < C(f) \rightarrow (e \rightarrow f) \vee (e \| f);$ $C(e) \Diamond C(f) \rightarrow (e \| f).$ K-Lamport clock is an extension of the Lamport clock with the logical time domain $T=N^K$ and the message tag domain $G=N^{K-1}$. The timestamp of each event is comprised of the process identity, the scalar Lamport timestamp, and a (K−1)-dimensional vector of maximum tags received by the process itself as well as its direct and indirect message suppliers. The process' Lamport clock and K−2 components of the maximum received tag vector are included with each message. The Lamport clock is maintained in the usual way, whereas on a message receipt event, the k-th component of the local logical time vector, k>1, is set to a maximum of its previous value and the value of (k−1) component of the message tag. Using all the components when comparing timestamps allow, in some cases, to detect concurrency between events whose scalar timestamps (or vector timestamps of smaller size) are consistent with the existence of causal ordering.

Partially Ordered Process Event Sets

Model

The model of distributed computation originally considered by Lamport was based on the assumption that all events occurring within the same process are sequentially ordered. This model is not applicable in a multithreaded process environment where the tasks are being created and terminated dynamically and executed in parallel, yet the data and control dependencies may exist that establish causal relation between events of different tasks. The straight-forward solution based which attempts to consider each thread as a process in the original model is quite limited, as in this case the size of the data structures to maintain the isomorphic logical time and the associated processing and communication overhead become unbounded.

For a process with partially ordered event sets, two types of event causality relations are defined: internal causality and message causality. Internal causality is induced between the events of the same process by the existing data and control dependencies which are assumed to be known to the process. Message causality exists between each pair of corresponding message send and message receive events. The causal precedence relation on the entire event set of the distributed system is the transitive closure of the union of the two.

Vector Clock Extensions

C. Fidge, in an article entitled "Logical time in distributed computing systems", which appeared in Computer, Vol. 24(8), pp. 28–33, 1991, suggested a method to apply the vector time approach to parallel environment. Fidge extended the Lamport definition of the "happened-before" to include the causal ordering created by forking a task and terminating a task, and replaced the notion of a vector by a set-of-pairs concept, where each pair pertains to a parallel task and contains the task identifier and the counter value. This method requires that the number of task be bounded by a value known in advance and does not allow recursive task definition.

More recently, Audenaert, in an article entitled "Clock trees: Logical clocks for programs with nested parallelism", that appeared in IEEE Transactions on Software Engineering, Vol. 23, pp. 646–658, October 1997, proposed a new timestamping method of clock trees which applies in a distributed system where processes exhibit nested parallelism. A nested-parallel execution can be recursively decomposed into unnested partially ordered sets of events. Each partially ordered segment of parallel tasks may:

i. entirely belong to the causal past of the given event, or ii. entirely lay outside its causal past, or iii. belong to the casual past only partially.

In the first case (i) the segment of parallel tasks is treated as a single event in the execution history of the respective process; a single component in the vector timestamp of the given event suffices to capture the causal ordering. This timestamp is referred to as a quotient vector. In case (iii) case, however, additional information is required. This information is provided by a remainder vector that contains one clock tree for each parallel task in the nested segment. This recursive definition gives rise to a tree structured clock where each node, or local component, contains the event's quotient vector and the event's remainder vector for the current level of decomposition.

The clock trees are effective for the special case of distributed computation. In the general case their size effectively reaches that of a flat vector clock (and even exceeds it due to the overhead pointer structures).

Bit Matrix Clock

Bit-matrix clock is an isomorphic logical time system for processes with partially ordered events sets. (See, e.g., Ahuja, Carlson, and Gahlot, "Passive-space and time view: Vector clocks for achieving higher performance, program correction, and distributed computing", IEEE Transactions on Software Engineering, Vol. 19(9), pp. 845–855, September 1993.) For a distributed system containing n processes, the logical time domain T of bit-matrix clock is the set of all non-negative integer vectors of size n: $T=N_n$. However, unlike the regular vector clock, each component of the vector is interpreted as a bitmap, rather than an event counter: the k-th bit position of the j-th component of the clock structure maintained by process $P_i$ is 1, if the k-th event of process $P_j$ causally precedes the current event of process $P_i$; the bitmap position is 0 otherwise. The length of j-th component grows linearly with the number of events occurring at process $P_j$.

All bitmap components are initialized to zero and are updated with each internal or message send event by taking the bit-wise inclusive-or operation over bit-matrix timestamps of all local events that causally precede the given event. It can be done using the process' knowledge of the internal data and control dependencies and the timestamps of the local events. Besides, the bit corresponding to the event itself in the local bitmap vector component is set to 1. Each transmitted message carries the entire timestamp of the corresponding send event. On message receive event, the timestamp is computed by taking the bit-wise inclusive-or operation over bit-matrix timestamps of all local events that causally precede the given event and the corresponding send event timestamp extracted from the message. The corresponding to the event itself is also set.

Modifications To The Bit Matrix Clock

Two alternative representations of the dependency information were proposed in an article by Prakash and Singhal entitled "Dependency sequences and hierarchical clocks: Efficient alternatives to vector clock for mobile computing systems", that appeared in Wireless Networks, 41(2) :349–360, 15 March 1997. The method of dependency sequences presents an alternative encoding of the bitmap vector components which allows to store and transmit the sets of dependency gaps expressed in terms of local event identity pairs, rather than the bitmap itself This method may or may not be advantageous depending on the bitmap pattern. Generally, any lossless data compression technique may be useful in this situation.

Another method, described by Gahlot and Singhal in an article entitled "Heirarchial Clocks", that appeared as a Technical Report OSU-CISRC-93-TR19, Dept. of Comput. and Inf. Sci., Ohio State Univ., Columbus, Ohio., USA, May 1993, can be described as two-level hierarchical clock. In order to reduce the on-line communication and storage overhead, the method uses a timestamp which contains a global component analogous to a conventional vector clock, and a local component which is represented by a variable length bit-vector specifying the causal precedence within the process event set. Unfortunately, the definition of the causal precedence relation used in deriving the two-level hierarchical clock is not without problems, therefore continuing methods and approaches are requried.

SUMMARY OF THE INVENTION

I have developed a new logical time system, the Hierarchical Vector Clock (HVC), which can be used to capture casual precedence relation in the large distributed systems with dynamically varying number of processes. Hierarchical Vector Clock is a variable size clock; while approximating the isomorphic vector clock, it requires much smaller communication and storage overhead: for distributed system containing $N^K$ processes, its communication and storage requirements are of the order N×K.

Hierarchical Vector Clock is both hierarchical and scalable. It is not restricted to any fixed number of hierarchy levels and can be naturally extended by employing the nested data structures and recursive invocation of the algorithms. In the simplest single-layer case, HVC becomes a variation of an isomorphic vector clock. HVC is ideally suited for the modern message-passing distributed systems which use the underlying communication networks of highly hierarchical structure.

Further features and advantages of the present invention, as well as the structure and operation of various embodiments of the present invention are described in detail below with reference to the accompanying drawing.

DETAILED DESCRIPTION OF THE INVENTION

Figure 1:
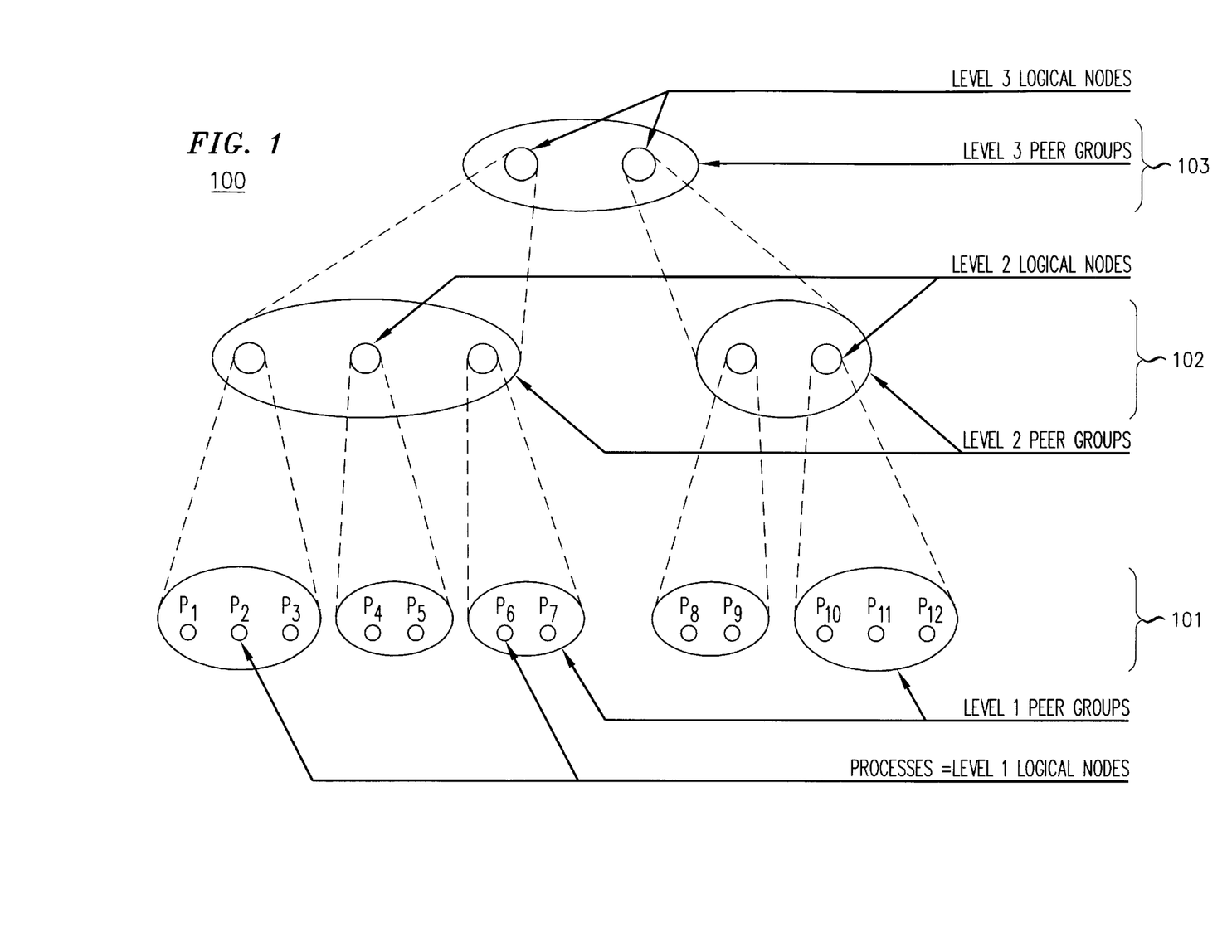
FIG. 1 shows an example of a hierarchical distributed system with L=3.

With reference now to FIG. 1, consider an asynchronous message-passing distributed system 100 in which processes are hierarchically grouped into clusters. On each level of hierarchy (101, 102, 103), such a cluster represents a logical node which belongs to a corresponding peer group of nodes. Each peer group, in its turn, makes a logical node on the higher level of hierarchy. A process itself is a logical node of the lowest level.

Let L be the total number of hierarchy levels in a system and assume that for a non-hierarchical system, L=1. Let $G_k(P_i)$ denote the peer group to which a logical node encompassing process $P_i$ belongs on the k-th level of hierarchy. Then the process can be completely identified by its hierarchical address:

$$\text{Addr } (P_i) = \langle g_1^i : g_2^i : g_3^i : \ldots : g_L^i \rangle; \qquad [5]$$

where $g_1^i \equiv p^i$ is the $P_i$'s process id within $G_1(P_i)$, its peer group of the lowest level, and $g_k$, k=2, ..., L, is the group id of the k-level logical node, which encompasses $P_i$, within the corresponding peer group. As can be appreciated, FIG. 1 shows an example of a hierarchical distributed system with L=3.

Let $\text{Hdist}(P_i, P_j)$ be the hierarchical distance between processes $P_i$ and $P_j$, i.e., the lowest level of hierarchy on which these processes appear in the same peer group of logical nodes (but not in the same logical node). For example, in FIG. 1, $\text{Hdist}(P_1, P_3)=1$, $\text{Hdist}(P_2, P_6)=2$, $\text{Hdist}(P_7, P_8)=3$. By definition $\text{Hdist}(P_i, P_i)=0$.

HVC applies the vector clock recursively on each level of hierarchy. This requires consolidation of a vector timestamp pertaining to a peer group into a single norm value associated with the logical node.

The domain of the logical time maintained by process $P_i$ is the set of non-negative integer vectors:

$$T = N^{D_i}, \qquad [6]$$

where $D_i = \Sigma_{k=1}^{L} \|G_k(P_i)\|$. Here, $\|G\|$ denotes cardinality of set G. Note the size of the logical clock may vary from one process to another and is guaranteed to remain the same only for the processes of the same lowest level peer group. The clock value maintained by process $P_i$ can be represented as:

$$V^i = (\bar{v}_1^i, \bar{v}_2^i \ldots \bar{v}_L^i); \qquad [7]$$

where $\bar{v}_k^i \in N^{\|G_k(P_i)\|}$. The components $\bar{v}_1^i \lfloor p^i \rfloor \bar{v}_1^i \lfloor p^i \rfloor$ and $\bar{v}_k^i \lfloor g_k^i \rfloor$, k=2, ..., L, are referred to as local components, since they pertain to the logical nodes in which process $P_i$ appears itself. All vector components of HVC value are initially set to zero. When an internal event occurs, the local component of the lowest level vector is incremented, and the updated value is used to timestamp the event:

$$\bar{v}_1^i \lfloor p^i \rfloor = \bar{v}_1^i \lfloor p^i \rfloor + 1; \qquad [8]$$

When a message is sent by process $P_i$ to process $P_j$ (the communicating parties are supposed to know addresses of each other), in addition to the timestamping procedure analogous to that for an internal event, the message tag s has to be formed. The size and contents of the tag depend upon the value, $r = \text{Hdist}(P_i, P_j)$. If r=1, the tag is identical to the timestamp of the send message event:

$$s := \bar{v}_1^i, \bar{v}_2^i, \ldots \bar{v}_L^i. \qquad [9]$$

If, on the other hand, $1<r\leq L$, then $$s:=\tilde{v}_r^i, \tilde{v}_{r+1}^i, \ldots \tilde{v}_L^i. \quad [10]$$

Where $\tilde{v}_r^i$ is obtained from $\bar{v}_r^i$ by substituting the level r logical time component by the local component of level 1:

$$\tilde{v}_r^i\lfloor g_r^i\rfloor \bar{v}_1^i\lfloor p^i\rfloor +1; \quad [11]$$

Note that when r=1, the transformation (11) gives a consistent result as well. An important property of the message tag is that its size gets smaller as the distance between the sender and the receiver in the process hierarchy increases.

Upon receipt of a message from process $P_i$ carrying the tag $$s=(s_0 s_1 \ldots s_m); \quad [12]$$

where m=L−Hdist$_i(P_i,P_j)$, process $P_j$ updates its logical time value by computing the component-wise maximum between the corresponding vectors:

$$\bar{v}_k^{ji}:=\max\{\bar{v}_k^j, s_{k-r}\}, \forall k=r, \ldots L; \quad [13]$$

In addition, the local component of the lowest level vector is updated:

$$\bar{v}_k^{ji}[p^i]:=\max\{\bar{v}_1^j, p^j, s_0[g_r^i]\}, +1; \quad [14]$$

and the new value of the $P_j$'s logical time is used to stamp the receive event.

Figure 2:
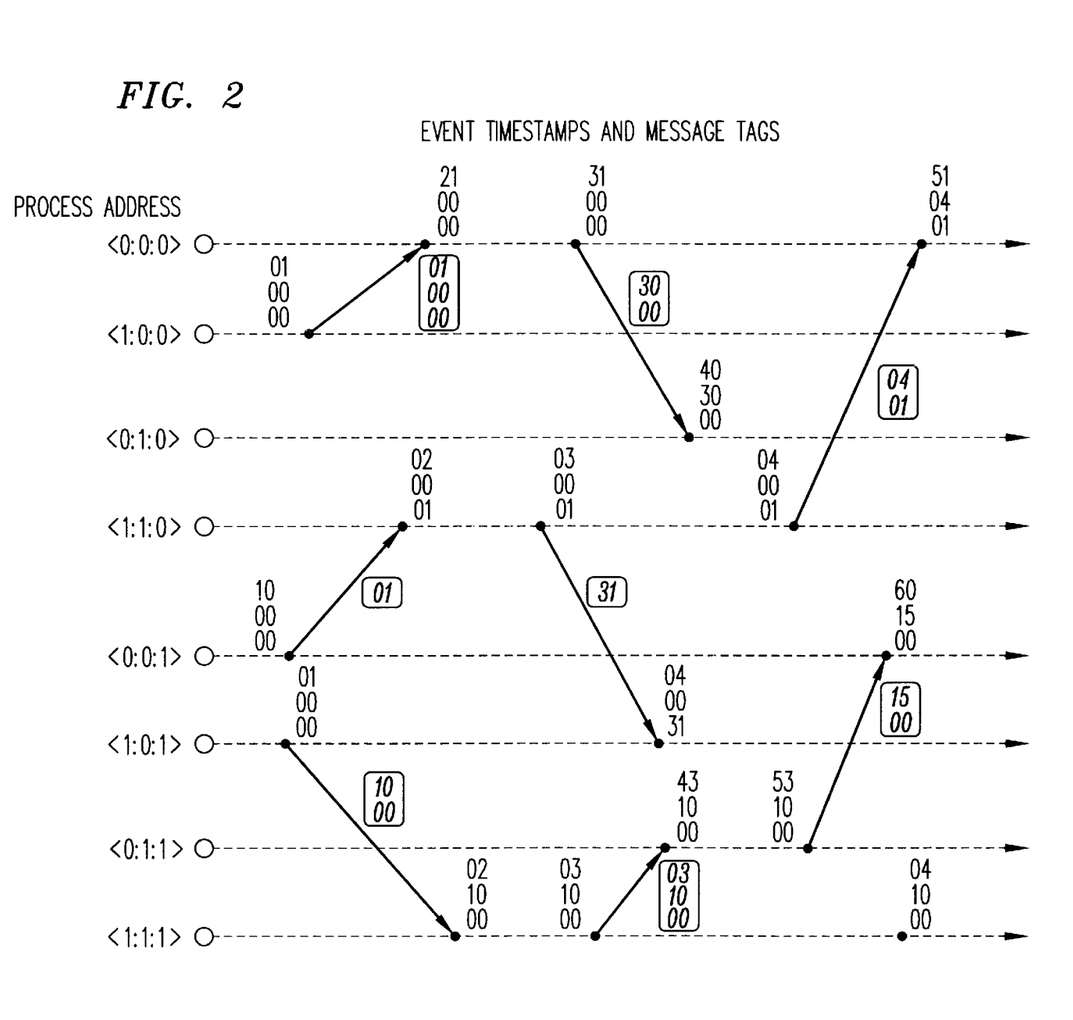
FIG. 2 shows an example of distributed computation.

The logical time maintenance and message tag construction rules are illustrated in FIG. 2. Observe that local component of the lowest level vector is nothing else than Lamport clock which is transmitted in each message regardless the hierarchical distance between the sender and the receiver. The lowest level vector itself is similar to a vector clock, keeping the index of the most recent event which have occurred at a corresponding process within the same lowest level peer group and which became known to the given process through a message exchange that group. It differs from a conventional vector clock in that the event indices grow faster, since they are updated on each message receipt according to the Lamport's maximization rule, rather than by unit increments. Similarly, the higher level vector components keep the indices of the most recent events which occurred in a corresponding logical node and became known to the given process through a message exchange taking place entirely between the processes of the same peer group of nodes on the respective level of hierarchy.

Causal Precedence

Given a pair of events, e and f identified by their timestamps, $V^e$ and $V^f$, and the respective process addresses, Addr($P_i$) and Addr($P_j$), we would like to establish, with some degree of accuracy, the existence of the causal ordering between these events. First, we use the Lamport component of the timestamps, $L(e)=\bar{v}_1^e[p^i]$ and $L(e)=\bar{v}_1^f[p^{ji}]$, to formulate a hypothesis about their causal ordering and then verify that hypothesis using the available information. Note that in the trivial case, Addr($P_i$)=Addr($P_j$), Lamport clock completely and reliably characterizes causality.

If Addr($P_i$)≠Addr($P_j$) and L(e)=L(f), we immediately conclude that events e and f are concurrent. Let L(e)<L(f). Then either events e and f are concurrent or e causally precedes f The core part of the procedure which tests the hypothesis that e→f is outlined below. Rejecting the hypothesis corresponds to establishing concurrency between e and f this decision is guaranteed to be accurate. If the hypothesis is confirmed, the conclusion e→f still may or may not be true.

1. Compute r=Hdist($P_i,P_j$).
2. Do for all k in the range from L down to r, until decision is made:
   if $\bar{v}_k^f<\bar{v}_k^e$ or $\bar{v}_k^f \Diamond \bar{v}_k^e$,
      then reject the hypothesis;
   else if $\bar{v}_k^e<\bar{v}_k^f$ and $\bar{v}_1^e[p^i]\leq\bar{v}_k^f[g_k^i]$
      then confirm the hypothesis;
   else decrement k and iterate step 2.

If all of the heirarchy levels in the range have been checked and a decision has not been made, then reject the hypothesis.

Various additional modifications of this invention will occur to those skilled in the art. Nevertheless, all deviations from the specific teachings of this specification that basically rely upon the principles and their equivalents through which the art has been advanced are properly considered within the scope of the invention as described and claimed.

What is claimed is:

1. A hierarchical vector clock method of detecting a causal precedence relation between events in an asynchronous distributed system, said system comprising:

a plurality of processes each of which is executing on a separate physical node and exchanging information with other processes by transmitting messages over a communications network connecting the nodes, said events including message receive events and message send events, said processes of the distributed system being hierarchically grouped on two or more hierarchy levels, wherein:

each hierarchy level comprises one or more peer groups;

each peer group comprises one or more logical nodes;

the processes are the logical nodes of the lowest hierarchy level; and each logical node of an (i+1)-th hierarchy level represents a peer group of an i-th hierarchy level, where $i\geq 1$, said method comprising:

maintaining logical time in each individual process, said logical time comprising a plurality of integer vectors, one said vector for each hierarchy level in the distributed system, each of said vectors having a size equal to the number of said logical nodes in said peer group of logical nodes on the respective hierarchy level.

2. The method of claim 1 wherein each component of each vector of said plurality of vectors maintained by said individual process is pre-initialized to an integer value, is non-decreasing with the evolution of the distributed system and a) each component of the first vector of said plurality of vectors maintained by the individual processes is associated with each respective node of said peer group of logical nodes of the lowest hierarchy level;

b) exactly one of said components of said first vector corresponds to said process itself, said component being a local component of the lowest hierarchy level;

c) each component of second and higher vectors of said plurality of vectors is associated with each respective logical node of said peer group of logical nodes on the respective hierarchy level;

d) exactly one of said components of each vector is associated with a logical node to which said process belongs itself, said component being the local component of the respective hierarchy level.

3. The method of claim 2 wherein:

a) said local component of the lowest hierarchy level maintained by said individual process always exceeds the number of events in the longest chain of events causally preceding the current event of said individual process, said local component of the lowest hierarchy level being a Lamport clock of said individual process;

b) each non-local component of said first vector maintained by said individual process is equal to the largest value of the Lamport clock of respective other processes of said peer group of nodes of the lowest hierarchy level, said largest value corresponding to an event of said other processes, said event causally preceding the current event of said individual process;

c) said local component of said second and higher vectors of said plurality of vectors maintained by said individual process is equal to the largest value of the Lamport clock of other processes of the same logical node on the respective hierarchy level, said largest value corresponding to an event of one of said other processes, said event causally preceding the current event of said individual process; and d) each non-local component of said second and higher vectors of said plurality of vectors maintained by said individual process is equal to the largest value of the Lamport clock of a process belonging to another respective logical node of said peer group of logical nodes on the respective hierarchy level, said largest value corresponding to an event of said process of said respective other logical node, said event causally preceding the current event of said individual process.

4. The method according to claim 3 wherein each message sent by a first process to a second process of the distributed system contains a portion of the plurality of vectors maintained by the first process, said portion being restricted to those vectors of said plurality which correspond to the hierarchy levels on which the first process and the second process belong to the same peer group of logical nodes, the local component of the lowest sent vector being substituted by the Lamport clock of the first process.

5. The method according to claim 3 wherein a) on occurrence of a local event of message send event at an individual process, the Lamport clock of the individual process is incremented by a positive integer value;

b) on receipt of a message from a first process occurring at a second process:

i) the Lamport clock value of the second process is set to the maximum of the previous Lamport clock value and the local component of the lowest sent vector of said message, said maximized Lamport clock value being incremented by a positive integer value;

ii) the vectors of theological time value maintained by said second process are updated by taking the component-wise maximum between the corresponding previous values and the values received in said message on the respective hierarchy levels.

6. The method according to claim 3 wherein each component of the plurality of vectors is pre-initialized to zero.

7. The method according to claim 5 wherein the Lamport clock of said individual process on occurrence of a local event or of a message send event is incremented by one.

8. The method according to claim 5 wherein the maximized Lamport clock of said second process on occurrence of a message receive event is incremented by one.

9. A method of detecting causal precedence in an asynchronous distributed system, comprising:

(A) organizing processes in the system into two or more hierarchy levels;

(B) for each process in the system, maintaining logical time using a set of two or more integer vectors, wherein:

each hierarchy level comprises one or more peer groups;

each peer group comprises one or more logical nodes;

the processes are the logical nodes of the lowest hierarchy level;

each logical node of an (i+1)-th hierarchy level represents a peer group of an i-th hierarchy level, where $i>1$;

for each process, the number of vectors in the set is equal to the number of hierarchy levels in the system and each vector in the set corresponds to a different hierarchy level; and for each vector, the number of components in the vector is equal to the number of nodes in the corresponding peer group of the corresponding hierarchy level and each component of the vector corresponds to a different node of the peer group.

10. The invention of claim 9, wherein a number of processes in the system varies dynamically.

11. The invention of claim 9, wherein, for at least two processes in the system, vectors corresponding to the same hierarchy level have different numbers of components.

12. The invention of claim 9, further comprising:

(C) sending a message having a time tag from a first process to a second process; and (D) updating logical time corresponding to the second process using the time tag.

13. The invention of claim 12, wherein sending the message comprises:

(C1) determining hierarchical distance between the first and second processes; and (C2) generating the time tag based on the hierarchical distance and logical time corresponding to the first process.

14. The invention of claim 12, wherein updating the logical time comprises, for each vector component corresponding to the second process, generating a new value for the component by selecting a maximum value from (i) a current value of the component and (ii) a value in the time tag corresponding to the component.

* * * * *

UNITED STATES PATENT AND TRADEMARK OFFICE
CERTIFICATE OF CORRECTION

PATENT NO.   : 6,574,665 B1
DATED        : June 3, 2003
INVENTOR(S)  : Denis Andreyevich Khotimsky It is certified that error appears in the above-identified patent and that said Letters Patent is hereby corrected as shown below:

Title page,
Item [56], References Cited, OTHER PUBLICATIONS, please replace
"F. Mattern, "Virtual Time and Global States of Distributed Systems", *Parallel And Distributed Aglorithms, M. Cosnard et al.* (editors), Elsevier Science Publishers B.V. (North Holland), 1988, pp 215-226." with
-- F. Mattern, "Virtual Time and Global States of Distributed Systems", *Parallel And Distributed Aglorithms, M. Cosnard et al.* (editors), Elsevier Science Publishers B.V. (North Holland), 1989, pp 215-226. --

Signed and Sealed this

Twenty-third Day of September, 2003

JAMES E. ROGAN
*Director of the United States Patent and Trademark Office*